Nov. 23, 1943.  M. J. MITCHELL ET AL  2,334,945
HARVESTER
Filed Sept. 21, 1942   2 Sheets-Sheet 1
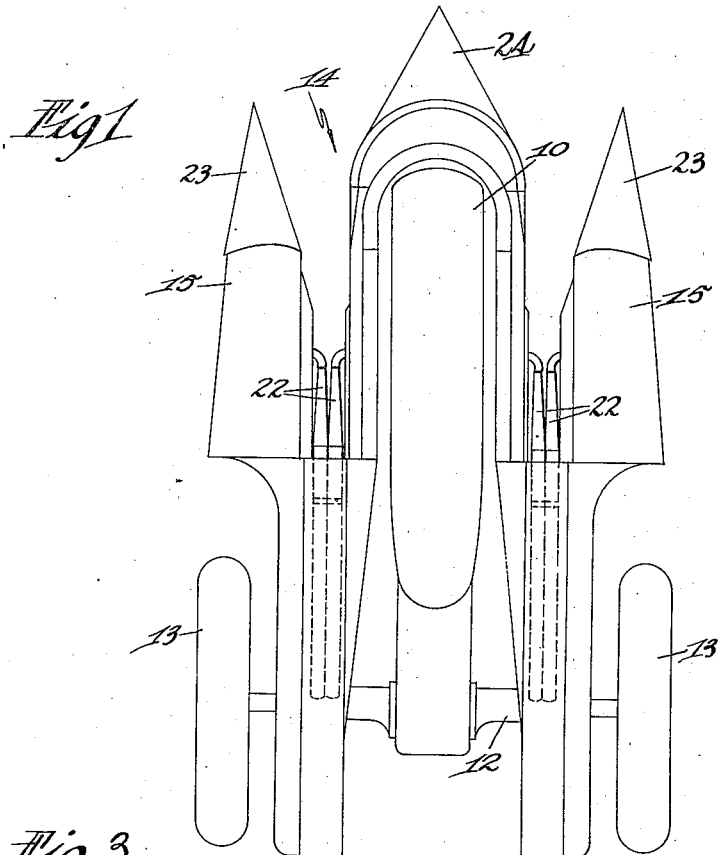
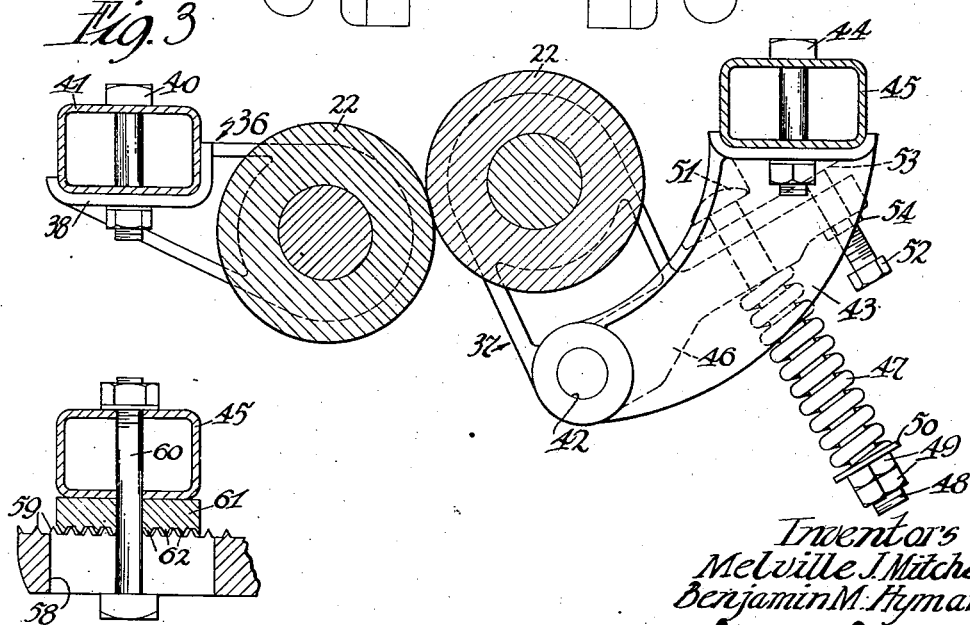
Inventors
Melville J. Mitchell
Benjamin M. Hyman
By Paul O. Pippel
Atty.

Nov. 23, 1943.　　　M. J. MITCHELL ET AL　　　2,334,945
HARVESTER
Filed Sept. 21, 1942　　　2 Sheets-Sheet 2
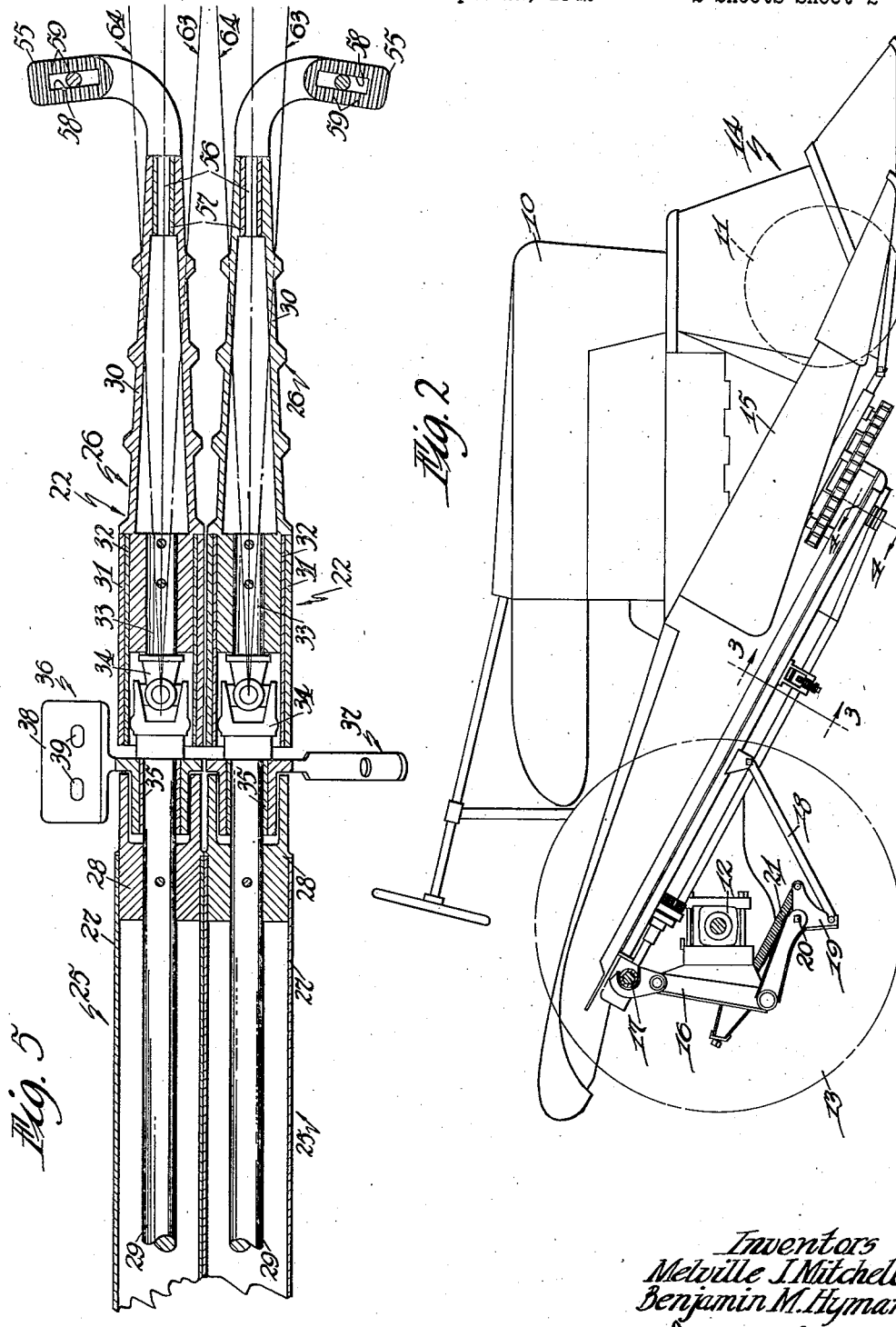
Inventors
Melville J. Mitchell
Benjamin M. Hyman
By Pane O Pippel
Atty.

Patented Nov. 23, 1943

2,334,945

UNITED STATES PATENT OFFICE 2,334,945

HARVESTER

Melville J. Mitchell, Highland Park, and Benjamin M. Hyman, Moline, Ill., assignors to International Harvester Company, a corporation of New Jersey Application September 21, 1942, Serial No. 459,092

14 Claims. (Cl. 56—105)

This invention relates to a harvester. More particularly it relates to the picking rolls of a corn picker.

Frequently it is necessary that a two-row corn picker be capable of picking corn from adjacent rows, the spacing of which may vary. It is a difficult thing to adjust one set of rolls with respect to the other so that the spacing between the sets is changed, since the rolls are heavy and their mounting is necessarily complicated. The present invention has to do with an arrangement by which a two-row corn picker may be easily adjusted for harvesting adjacent rows of different spacing. The present invention also has to do with a resilient mounting for the rolls which will avoid choking.

An object of the present invention is to provide an improved harvester.

A further object is the provision of an improved corn picker.

Another object is to provide an arrangement for adapting a two-row harvester to the harvesting of adjacent rows of crops of varying spacings.

A still further object is the provision of a special mounting for harvesting rolls which will yield when choking of the rolls occurs.

Other objects will appear from the disclosure.

According to the present invention, the two pairs of harvesting rolls of a two-row corn picker are formed so that each roll is composed of a husking section and a snapping section pivotally connected to the husking section, and so that the snapping sections may be shifted laterally to adapt the rows for picking from adjacent rows of different spacings. One roll of each pair of rolls is provided with a resilient mounting so that the spacing between each pair of rolls may be varied.

In the drawings,

Figure 1 is a plan view, showing the improved corn picker of the present invention;

Figure 2 is a side view of a portion of the corn picker;

Figure 3 is a sectional view taken on the line 3—3 of Figure 2;

Figure 4 is a sectional view taken on the line 4—4 of Figure 2; and

Figure 5 is a sectional view taken through the harvesting rolls employed in the corn picker of the present invention.

The reference character 10 designates a narrow body of a tractor having a narrow front steering truck 11, a rear axle 12, and rear wheels 13. Mounted upon the tractor is a corn picker 14 which includes a pair of harvesting units 15 positioned at opposite sides of the tractor. The picker 14 is carried upon the rear axle 12 by structure 16 secured thereto and providing a pivot 17 for the picker. As seen in Figure 2, a link 18 extends from a mid point of each harvesting unit 15 to a bell-crank 19 pivoted at 20 on the structure 16. A spring 21 connected to the bell-crank 19 acts through the bell-crank 19 and the link 18 to counterbalance the harvesting unit 15. Each harvesting unit 15 comprises a pair of harvesting rolls 22 and a divider point 23. A central divider point 24 extends across the front of the tractor body and is supported at each side on the harvesting units 15. The harvesting rolls 22, mounted at the right side of the tractor body 10, are shown in detail in Figure 5, and each roll is seen to comprise a husking section 25 and a snapping section 26. The husking section 25 is formed of a tube 27, a hub 28 to which the tube 27 is secured, and a shaft 29, to which the hub 28 is secured. The snapping section 26 comprises a casting 30, a pair of sleeves 31 and 32 secured upon one end of the casting 30, and a stub shaft 33 secured within one end of the casting 30. A universal joint 34 connects the shafts 29 and 33 and so serves as a pivotal connection between the husking section 25 and the snapping section 26. The ends of the shafts 29 are journaled in bearings 35 mounted in brackets 36 and 37. The bracket 36 has a wide portion 38 having holes 39 through which extend bolts 40 securing the bracket 36 to a tubular member 41 (Figure 3) forming part of a framework, not otherwise shown, for the harvesting unit 15. The bracket provides rigid support for the one shaft 29 and the harvesting roll 22, of which the one shaft 29 is a part. As shown in Figure 3, the bracket 37 is pivoted at 42 on a bracket 43 secured by a bolt 44 to a tubular member 45, similar to the tubular member 41 and likewise forming part of the framework for the harvesting unit 15. The bracket 37 has a portion 46 which is held against the bracket 43 by a spring 47, a bolt 48 extending through spring 47, bracket 43, and portion 46 of bracket 37. Nuts 49 and a washer 50 retain the spring 47 on the bolt 48. A head 51 on the bolt 48 rests against the bracket 43. It will be seen that, by virtue of the pivotal mounting 42 of the bracket 37 on the bracket 43 and the action of the spring 47, the right-hand roll 22, as viewed in Figure 3, may move away from the left-hand roll 22 about the pivot 42 against the spring 47. A bolt 52 threaded through the portion 43 of the bracket 37 and abutting a portion 53 of the bracket 43 limits the movement of the right-hand roll 22 toward the left-hand roll 22. Adjustment of the bolt 52 adjusts the limit of this movement. A lock-nut 54 locks the bolt 52 to the portion 46 of the bracket 37. The forward end of the casting 30 is carried on an L-shaped bracket 55 which has a reduced portion 56 extending into the casting 30 and rotatably supporting it on a sleeve 57. The bracket 55 has at its other end an elongated slot 58 and has teeth 59 formed on its top surface around the slot 58. As seen in Figure 4, the L-shaped bracket 55 for the lower roll 22, as viewed in Figure 5, which is the right-hand or outer roll of the harvesting unit 15 at the right side of the tractor, is secured to the tubular member 45 by a bolt 60 extending through the tubular member 45 and slot 58 in the L-shaped bracket 55. The bolt also extends through a piece 61 having teeth 62 engaging teeth 59 on the L-shaped bracket 55, so as to prevent lateral movement of the L-shaped bracket with respect to the piece 61. The L-shaped bracket 55 for the upper roll of Figure 5 is supported in a similar manner on the tubular member 41. The pair of snapping rolls 14 at the right side of the tractor body 10 are constructed and supported in similar fashion to the pair of rolls shown in Figure 4.

The operation of the corn picker 12 is well understood. The corn picker and tractor upon which the picker is mounted are moved through a field of corn to pick or snap ears from adjacent corn rows. It is desirable that the distance between the corn rows be equal to the distance from the space between one pair of harvesting rolls to the space between the other pair of harvesting rolls. However, in some cases the spacing between adjacent rows of corn may be different from this distance and the pairs of harvesting rolls 14 are adapted to picking ears at the changed spacing by adjustment of the snapping sections 26 of the rolls. If, for example, the spacing between adjacent rows of corn becomes greater than the distance between the pairs of rolls, then the snapping sections 26 of the rolls are moved outwardly from the tractor body 10. This is accomplished by loosening of the bolts 60 and a shifting of the L-shaped brackets 55 with respect to the tubular members 41 and 45 and the pieces 61 from the position shown in Figure 4 outwardly or downwardly, as viewed in Figure 4, to the position represented by center lines 63. Similarly, the snapping sections 26 of the other pair of rolls 22 will be shifted outwardly in the opposite direction, and the resulting increased spacing between the snapping sections 25 of one pair of rolls and the snapping sections 25 of the other pair of rolls adapts the rolls 22 to snapping ears of corn from adjacent rows, the spacing of which is greater than the regular spacing between the rolls 22 as determined by the spacing between the husking sections 25 of the pairs of rolls 22. If the spacing between the adjacent rows of corn becomes less than the spacing between the regular spacing of the pairs of rolls 22, then the snapping sections 26 for each pair of rolls 22 are moved inwardly so that they may receive the stalks of the adjacent rows of lesser spacing. In this case, the snapping sections 26 of the pair of rolls 22 shown in Figure 5 are shifted to the position represented by center lines 64, i. e., toward the tractor body 10. Similarly, the snapping sections of the other pair of rolls are shifted. Whether the forward end portions 30 of the snapping rolls 22 be shifted in or out to accommodate greater or lesser spacings between adjacent corn rows, the universal joints 34, forming connections between the forward end portions 30 and the main portions 27, permit the necessary shifting of the forward end portions 30. It is also possible to shift the snapping sections of one pair of rolls without disturbing those of the other pair of rolls.

As previouslly described, the right-hand or outer roll 22 for the pair of rolls 22 at the right side of the tractor body 10 has a resilient mounting at a mid point on the bracket 37 pivoting at 42 against the action of spring 47, so that the outer roll 22 may move away from the left-hand or inner roll 22. This will take place when there is a choking due to too large a size of stalks or catching of ears or other material between the rolls 22. The universal joint 34 permits the necessary pivoting of the husking section 25 with respect to the snapping section 26. The outer or left-hand roll 22 of the pair of rolls 22 at the left side of the tractor body 10 is provided with a similar resilient mounting at its mid point.

It will be apparent from the foregoing description that a new and novel arrangement has been provided by which pairs of harvesting rolls of a two-row-corn picker are held at fixed spacing from one another and yet are adapted to snap ears from adjacent rows of corn stalks, the spacing between which may be greater or less than the spacing between the pairs of harvesting rolls. This is accomplished by the provision of forward ends on the harvesting rolls which are pivotally connected to the main portions of the rolls in universal joints, so that these forward portions may be shifted laterally in or out to accommodate the greater or lesser spacing of adjacent corn rows. Since the forward end portions are shifted to correspond to the shift of adjacent rows, they may receive the stalks of the adjacent rows between them and guide them into pairs of rolls separated from one another at a different spacing. The middle portion of one roll of each pair of rolls is provided with a resilient mounting which permits movement of the one roll away from the other for an increased spacing between the rolls.

The intention is to limit the invention only within the scope of the appended claims.

What is claimed is:

1. In combination, a supporting frame adapted to be moved over the ground, a first pair of harvesting rolls having forward lower ends pivotally connected to the main portion of the first pair of harvesting rolls, a second pair of harvesting rolls having forward lower ends pivotally connected to the main portion of the second pair of harvesting rolls, means rotatably mounting the pairs of harvesting rolls on the frame with one pair of harvesting rolls spaced a certain amount from the other pair, and means for laterally adjusting the lower forward ends of the pairs of harvesting rolls to change the spacing between the lower forward ends of one pair of rolls and the lower forward ends of the other pair of rolls to an amount different from the aforesaid certain amount of spacing between the pairs of rolls to adapt the pairs of harvesting rolls to snapping ears from adjacent rows of stalks of a spacing different from the said certain spacing of the pairs of rolls.

2. In combination, a supporting frame adapted to move over the ground, a first pair of harvesting rolls having lower forward ends pivotally connected to the main portion of the first pair of harvesting rolls, a second pair of harvesting rolls, means rotatably mounting the pairs of harvesting rolls on the frame with one pair of harvesting rolls spaced a certain amount from the other pair, and means for laterally adjusting the lower forward ends of the first pair of harvesting rolls to change the spacing between the same and the lower forward ends of the second pair of harvesting rolls to an amount different from the aforesaid amount of spacing between the pairs of rolls to adapt the pairs of harvesting rolls to snapping ears from adjacent rows of stalks of a spacing different from the said certain spacing of the pairs of rolls.

3. In combination, a supporting frame adapted to move over the ground, a first pair of crop-stripping members having forward ends movably connected to the main portion of the members, a second pair of crop-stripping members having forward ends movably connected to the main portion of the members, means mounting the pairs of members upon the frame with one pair of members spaced a certain amount from the other pair of members, and means for laterally adjusting the forward ends of the pairs of members to change the spacing between the forward ends of one pair of members and the forward ends of the other pair of members to an amount different from the said certain amount of spacing between the pairs of members to adapt the pairs of members to stripping crops from adjacent rows of stalks of a spacing different from the said certain spacing of the pairs of members.

4. In combination, a supporting frame adapted to move over the ground, a first pair of crop-stripping members having forward ends movably connected to the main portion of the members, a second pair of crop-stripping members, means mounting the pair of members on the frame with one pair of members spaced a certain amount from the other pair of members, and means for laterally adjusting the forward ends of the first pair of members to change the spacing between the same and the forward end of the second pair of members to an amount different from the said certain amount of spacing between the pair of members to adapt the pairs of members to stripping crops from adjacent row of stalks of a spacing different from the said certain spacing of the pairs of rolls.

5. In combination, a frame adapted to move over the ground, a first crop-gathering means having a forward end movably connected to the main portion of the means, a second crop-gathering means having a forward end movably connected to the main portion of the means, means mounting the two crop-gathering means on the frame with the one crop-gathering means spaced a certain amount from the second crop-gathering means, and means for laterally adjusting the forward ends of the two crop-gathering means to change the spacing between the forward ends to an amount different from the said certain amount of spacing between the two crop-gathering means to adapt the two crop-gathering means to gathering crops form adjacent rows of plants of a spacing different from the said certain spacing of the two crop-gathering means.

6. In combination, a frame adapted to move over the ground, a first crop-gathering means having a forward end movably connected to the main portion of the means, a second crop-gathering means, means mounting the two crop-gathering means on the frame with the one crop-gathering means spaced a certain amount from the second crop-gathering means, and means for laterally adjusting the forward end of the first crop-gathering means to change the spacing between the forward ends of the two crop-gathering means to an amount different from the said certain amount of spacing between the two crop-gathering means to adapt the two crop-gathering means to gathering crops from adjacent rows of plants of a spacing different from the said certain spacing of the two crop-gathering means.

7. In combination, a frame adapted to move over the ground, a first pair of harvesting rolls, a second pair of harvesting rolls, each roll of each pair of harvesting rolls being composed of a main portion, a forward end portion, and means connecting the portions in a universal joint, means rotatably mounting the pairs of rolls on the frame with the space between the main portions of one pair of harvesting rolls separated a certain distance from the space between the main portions of the other pair of harvesting rolls, and means for laterally adjusting the forward end portions of the rolls to change the distance from the space between the forward end portions of one pair of harvesting rolls to the space between the forward end portions of the other pair of harvesting rolls to an amount different from the distance between the space between the main portions of the pairs of rolls to adapt the two pairs of harvesting rolls to harvesting crops from adjacent rows of plants of a spacing different from the said certain distance between the spaces between the main portions of the two pairs of harvesting rolls.

8. In combination, a frame adapted to move over the ground, a first pair of harvesting rolls, each being composed of a main portion, a forward end portion, and means connecting the portions in a universal joint, a second pair of harvesting rolls, means mounting the pairs of harvesting rolls on the frame with the space between the main portions of the first pair of harvesting rolls separated from the space between the second pair of harvesting rolls a certain distance, and means for laterally adjusting the forward end portions of the first pair of harvesting rolls to change the distance from the space between the forward end portions of the first pair of snapping rolls to the space between the forward ends of the second pair of snapping rolls to an amount different from the distance from the space between the main portions of the first pair of rolls to the space between the second pair of rolls to adapt the two pairs of harvesting rolls to harvesting crops from adjacent rows of plants of a spacing different from the said certain distance between the spaces between the main portions of the two pairs of harvesting rolls.

9. In combination, a frame, a pair of harvesting rolls each having a main portion, a forward portion, and means connecting the portions in a universal joint, means mounting the main portions of the harvesting rolls on the frame, L-shaped brackets supporting the forward portions in one leg of the L and each having an elongated slot in the other leg of the L, and means adjustably mounting the brackets on the frame by means of the slots for lateral adjustment of the forward ends of the harvesting rolls.

10. In combination, a frame adapted to move over the ground, a first harvesting roll, means mounting the first harvesting roll on the frame, a second harvesting roll extending along the first harvesting roll and being formed of two sections pivotally connected to one another, means mounting the ends of the second harvesting roll on the frame, and means yieldingly mounting the second harvesting roll on the frame at a point adjacent the connection of the sections.

11. In combination, a frame adapted to move over the ground, a first roll comprising a snapping section and a husking section, means mounting the roll on the frame; a second roll extending along the first roll and comprising a snapping section, a husking section, and means pivotally connecting the husking and snapping sections, means mounting the ends of the second roll on the frame, and means yieldingly mounting the second roll on the frame at a point adjacent the connection between the husking and snapping sections.

12. In combination, a supporting frame adapted to be moved over the ground, a first pair of rolls each comprising a husking section and a snapping section pivotally connected to the husking section, a second pair of rolls each comprising a husking section and a snapping section pivotally connected to the husking section, means rotatably mounting the pairs of rolls on the frame with one pair of rolls spaced a certain amount from the other pair, and means for laterally adjusting the snapping sections of the pairs of rolls to change the spacing between the snapping sections of one pair of rolls and the snapping sections of the other pair of rolls to an amount different from the aforesaid certain amount of spacing between the pairs of rolls to adapt the pairs of rolls to snapping ears from adjacent rows of stalks of a spacing different from said certain spacing of the pairs of rolls.

13. In combination, a supporting frame adapted to move over the ground, a first pair of rolls each having a husking section and a snapping section pivotally connected to the husking section, a second pair of rolls each comprising a husking section and a snapping section, means rotatably mounting the pairs of rolls on the frame with one pair of rolls spaced a certain amount from the other pair, and means for laterally adjusting the snapping sections of the first pair of rolls to change the spacing between the same and the snapping sections of the second pair of rolls to an amount different from the aforesaid amount of spacing between the pairs of rolls to adapt the pairs of rolls to snapping ears from adjacent rows of stalks of a spacing different from the said certain spacing of the pairs of rolls.

14. In combination, a supporting frame adapted to be moved over the ground, a first pair of rolls each having a husking section and a snapping section pivotally connected to the husking section, a second pair of rolls each having a husking section and a snapping section pivotally connected to the husking section, means rotatably mounting the ends of the pairs of rolls on the frame with one pair of rolls spaced a certain amount from the other pair, means resiliently mounting on the supporting frame one roll of each pair of rolls adjacent the pivotal connection between the husking section and the snapping section, and means for laterally adjusting the snapping sections of the pairs of rolls to change the spacing between the snapping sections of one pair of rolls and the snapping sections of the other pair of rolls to an amount different from the aforesaid certain amount of spacing between the pairs of rolls to adapt the pairs of rolls to snapping ears from adjacent rows of stalks of a spacing different from said certain spacing of the pairs of rolls.

MELVILLE J. MITCHELL.
BENJAMIN M. HYMAN.

CERTIFICATE OF CORRECTION.

Patent No. 2,334,945. November 23, 1943.

MELVILLE J. MITCHELL, ET AL.

It is hereby certified that error appears in the printed specification of the above numbered patent requiring correction as follows: Page 3, first column, line 41, claim 4, for "pair" read --pairs--; and line 51, same claim, for "row" read --rows--; and line 68, claim 5, for "form" read --from--; and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.